(12) United States Patent
Moireau et al.

(10) Patent No.: US 6,316,058 B1
(45) Date of Patent: Nov. 13, 2001

(54) METHOD FOR MAKING A YARN AND PRODUCTS COMPRISING SAME

(75) Inventors: Patrick Moireau, Curienne; Bruno Gibello, Chambery, both of (FR)

(73) Assignee: Vetrotex France, Chambery (FR)

( * ) Notice: Subject to any disclaimer, the term of this patent is extended or adjusted under 35 U.S.C. 154(b) by 0 days.

(21) Appl. No.: 09/284,463

(22) PCT Filed: Aug. 7, 1998

(86) PCT No.: PCT/FR98/01764

§ 371 Date: Sep. 29, 1999

§ 102(e) Date: Sep. 29, 1999

(87) PCT Pub. No.: WO99/10291

PCT Pub. Date: Mar. 4, 1999

(30) Foreign Application Priority Data

Aug. 21, 1997 (FR) .................................................. 97 10529

(51) Int. Cl.[7] .................................................. C03C 25/02
(52) U.S. Cl. .................................................. 427/428; 427/429
(58) Field of Search .................................................. 427/428, 429

(56) References Cited

U.S. PATENT DOCUMENTS 3,943,540 * 3/1976 Vanderheyden ..................... 427/428

* cited by examiner

Primary Examiner—Elizabeth M. Cole
(74) Attorney, Agent, or Firm—Oblon, Spivak, McClelland, Maier & Neustadt, P.C.

(57) ABSTRACT

A process for manufacturing a continuous yarn, which entails the steps of:

Figure 1:
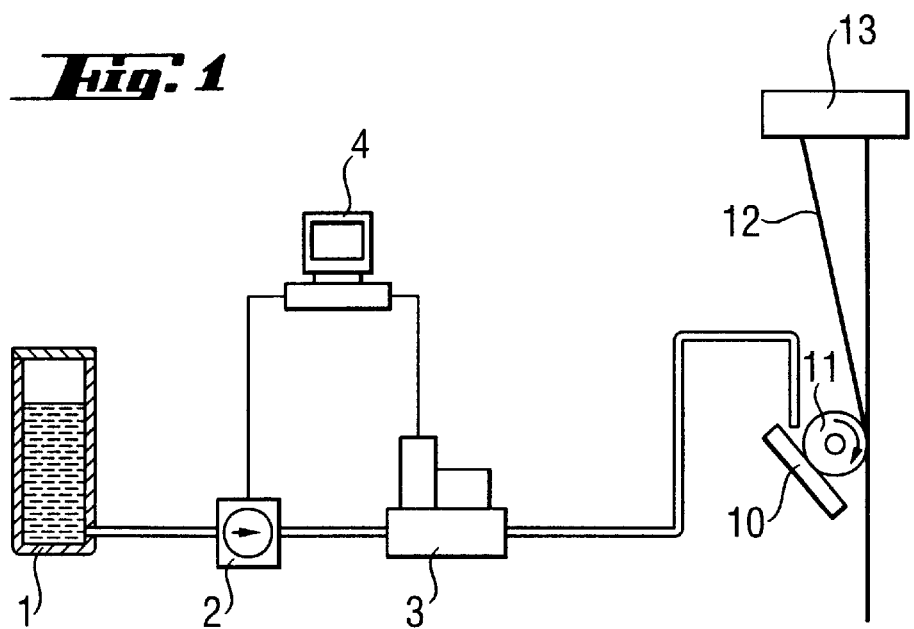

a) continously impregnating a mat of mechanically held-together fibers with a mixture of anhydrous size in a liquid state;

b) continuosly taking up at least some of the mixture of the anhydrous size by a sizing roller in contact with the mat such that a liquid film having an almost constant thickness of less than 8 $\mu$m is formed thereon; and c) depositing the mixture of the anhydrous size, using the sizing roller, on a surface of at least some of a multiplicity of continuous filaments which are formed by mechanical drawing of at least a multiplicity of streams containing molten glass flowing out of orifices of at least one device.

24 Claims, 2 Drawing Sheets

METHOD FOR MAKING A YARN AND PRODUCTS COMPRISING SAME

BACKGROUND OF THE INVENTION

1. Field of the Invention

The present invention relates to the field of reinforcing fibres and of composites and, in particular, to the deposition of size compositions on glass filaments (or yarns).

2. Description of the Background

The manufacture of reinforcing glass yarns is carried out, in a known way, starting from streams of molten glass flowing out of the orifices of spinnerets. These streams are drawn in the form of continuous filaments, and these filaments are then converged into base yarns, which are then collected.

Before they are converged into the form of yarns, the filaments are coated with a size by passing over a sizer. This deposition is necessary for obtaining the yarns and allows them to be combined with other organic and/or inorganic materials in order to produce composites.

The size firstly acts as a lubricant and protects the yarns from the abrasion that results from high-speed friction between the yarns and various devices during the aforementioned process.

The size may also, especially after it has cured, provide with the aforementioned yarns integrity, i.e. the mutual bonding of the filaments within the yarns. This integrity is especially desired in textile applications in which the yarns are subjected to high mechanical stresses. This is because, if the filaments are poorly held together, they break more easily and disrupt the operation of the textile machinery. What is more, non-integrated yarns are considered to be difficult to handle.

However, the size is also employed in cases in which this integrity is not desired, such as in the case of reinforcing fibres, when a high rate of impregnation with the material to be reinforced is desired. Thus, in the manufacture, for example, of pipes using direct impregnation and filament winding techniques, open yarns in which the filaments are separated from one another are used. Small quantities of size, especially less than 0.5% by weight, are then used.

The size also facilitates the wetting and/or impregnation of the yarns by the materials to be reinforced and helps to create bonds between the said yarns and the said materials. The mechanical properties of the composites obtained from the material and from the yarns depend in particular on the quality of the adhesion of the material to the said yarns and on the ability of the said yarns to be wetted and/or impregnated by the said material.

Most sizes currently used are aqueous sizes which are simple to handle but which must be deposited in large quantities on the filaments in order for them to be effective. Water generally represents more than 90% by weight of these sizes (especially for viscosity reasons), and this means that the yarns have to be dried before they are used, it being possible for water to impair the good adhesion between the yarns and the materials to be reinforced. These drying operations are lengthy and expensive and their effectiveness is not always optimal; they require the use of large-capacity ovens. In addition, when they are carried out during the fibre-forming operation (that is to say before the yarns obtained by converging the filaments have been collected), either on filaments (WO 92/05122) or on yarns (U.S Pat. No. 3,853,605), they require the installation of dryers under each spinneret and, when they are carried out on yarn packages, they run the risk of causing irregular and/or selective migration of the components of the size within the packages (aqueous sizes already have a tendency to be distributed over the yarns in an irregular manner because of their nature) and possibly of causing yarn-coloration or package-distortion phenomena. Moreover, without drying, package distortion is often observed on straight-sided packages (rovings) of fine yarns (i.e. yarns having a "count" or "linear density" of 300–600 tex (g/km) or less) which are coated with aqueous sizes.

It is to remedy these drawbacks that a novel type of size, which is virtually free of solvents and called an anhydrous size, has been developed. Anhydrous sizes are curable and/or crosslinkable solutions which optionally contain organic solvents and/or water in small amounts, generally of less than 5% by weight. They are distinguished advantageously from aqueous sizes by their ability to be distributed in a homogeneous and uniform manner on the surface of the filaments, i.e. forming films of constant thickness, and by the fact that they make any subsequent drying or solvent-removal treatment unnecessary since the small quantities of solvent evaporate during deposition of the size on the filaments and during curing of the size.

Furthermore, the quantities of anhydrous size deposited on the filaments are much less than those of aqueous size; thus, when depositing by means of a sizing roller, a film is formed on the surface of the latter with a thickness not exceeding 15 $\mu$m in the case of an anhydrous size instead of a film with a thickness of approximately 90 $\mu$m in the case of an aqueous size. Moreover, these small quantities of anhydrous size are deposited on the filaments with a much higher efficiency, possibly reaching 100% when the operating conditions are chosen judiciously, whereas this efficiency is generally about 40 to 75% with aqueous sizes.

Anhydrous sizes fall mainly into three categories.

The first category encompasses UV-curable sizes as described in Patent EP 0,570,283 and comprising, for example:

at least one mono-unsaturated or polyunsaturated monomer and/or oligomer of the polyester acrylate, epoxy acrylate, silicone compound or urethane acrylate type;

at least one photoinitiator, such as benzoin, acetophenone, benzophenone, sulphonylacetophenone and their derivatives, as well as thioxanthones;

if necessary, at least one organic solvent; and, optionally, additives such as at least a wetting agent, an adhesion promoter, an anti-shrinkage agent, a compatibilizer consisting especially of a silane.

The second family of anhydrous sizes is that of thermally curable and/or crosslinkable sizes, as described in Patent Applications FR 93/14792 and 96/00067.

By way of example, the basic system of these compositions comprises:

an acrylic component and a heat-activated radical-initiating peroxide; or an epoxy component and an anhydrous constituent which cure by reacting with each other.

The third category of anhydrous sizes forms part of the teaching of Applicant FR 97/05926: these are room-temperature curable sizes, the basic systems of which may contain one or more homopolymerizable monomers and/or at least two copolymerizable monomers which require no external supply of energy. In the case of copolymerization of two monomers, these may be deposited on the filaments in the form of their mixture in solution, immediately after this mixture has been formed, or in the form of a first stable solution containing a first monomer mixture and of a second stable solution containing a second monomer mixture. In the latter variant, the first solution is applied to the filaments and the second is applied subsequently thereto, at the latest while the filaments are being combined into yarns. Be that as it may, the copolymerization generally starts on the filaments as soon as the first and second monomers come into contact with each other and, if necessary, with the required catalyst or catalysts.

The UV-radiation treatments and heat treatments required to cure the sizes of the two first types mentioned above are carried out in one step or in several steps, after the filaments have been converged into yarns. Thus, depending on the envisaged use and on the nature of the yarns, an irradiation or heat pretreatment is sometimes carried out at the time of collecting the yarns in various forms of packages, in order to precure the size, the actual curing of which is carried out in a subsequent radiation or heat treatment when the yarn is unwound for the specific application for which it is intended, namely a textile application or an application of reinforcing organic or inorganic materials. This is because the yarn coated with the as yet uncured composition does not exhibit integrity in the ordinary sense of the term since the sheathed filaments of which the yarn is composed may slip over each other. This yarn can therefore be handled easily and, when it is wound in the form of packages, can be easily extracted from the packages without first having to undergo a treatment to cure the size. The yarn coated with the as yet uncured size composition has, moreover, a very high capability of being wetted and impregnated by materials to be reinforced, it thus being possible for impregnation to take place more rapidly (increase in productivity) and the composites obtained thus having a more homogeneous appearance and having certain of their mechanical properties improved.

However, as described in Patent EP-0,570,283, curing the size by the UV irradiation of a yarn in the form of a package may also have advantages.

With regard to depositing anhydrous sizes on glass filaments, several techniques are known. Thus, according to Application FR 97/05926 already mentioned, this deposition is carried out with the aid of a roller or of a sprayer, with the aid of a device which also acts as a converging means, or by the use of other yarns or filaments coated with the composition and brought into contact with the glass filaments. The latter technique makes reference to the special case of producing composite yarns, consisting of comingled glass filaments and thermoplastic polymer filaments or yarns.

By definition, deposition by spraying is inevitably accompanied by quite a significant amount of loss of size; the recovery of this lost proportion, assuming that it is possible, constitutes a handicap.

The method of deposition by means of a roller or of a device for converging the filaments into yarns consists of taking up size from a somewhat viscous and thick liquid film formed on a smooth surface, having ranges of physical properties, especially surface hardness and surface microporosity, of the type of those of metal surfaces. Starting from the observation that the chemical nature of the anhydrous sizes allows them to be used in ever lower quantities, there is currently a requirement for a process for forming an ever thinner liquid film, of perfectly uniform, controllable and reproducible thickness, on a macroscopicaly smooth surface of the metallic, ceramic or organic type. This is because it may be expected that the take-up of size onto the filaments from such a film results in the filaments being coated with a minimum quantity of size, with an increased deposition efficiency, i.e. a reduction in the amount of size lost, and for this to be achieved under completely controlled conditions. Finally, the aim is, of course, to obtain filaments and yarns, and reinforced materials containing them, which have sufficient, or at least preserved, mechanical properties or even in certain respects novel mechanical properties.

Currently, there is no process making it possible to form, in a controllable manner, a thin film of anhydrous size at the surface, for example, of a metal roller. This is because the immersion of the lower part of the roller in the size solution coupled with the rotation of the roller results in the formation, at the surface of the roller, of a layer whose characteristics can be controlled only to a small extent by varying the viscosity of the solution and the rate of rotation of the roller. The thickness of this layer is too great and irregular, and it is impossible to avoid loss of size, in the device for converging the filaments into yarns or for collecting the yarns, by the size being thrown off the yarns under the effect of the inherent centrifugal force at the high winding rates employed.

Moreover, no system for depositing size on a sizing roller with the aid of a metering pump and of an injection nozzle has yet allowed the formation of the desired film.

Furthermore, the previously-mentioned Patent EP 0,570, 283 briefly mentions, in its part describing FIG. 1, a coating device 13 consisting of an applicator provided with a felt moistened with a reactive mixture using a metering pump. This is because the structure of a felt allows it to soak up a solution in a particularly homogeneous manner. However, the take-up of size suggested by the European patent, from the felt onto the glass filaments, is not satisfactory in the context of the technical problem mentioned above since the deposition of the required small quantities of size on the filaments could not be achieved except at the cost of the felt drying out somewhat, a situation which, given the naturally irregular structure of the felt, the surface of which has fibres of varied dimensions, directions or even textures, would run the risk of the glass filaments catching thereon and therefore the risk of the said filaments breaking. Only relatively large amounts of size can thus be deposited in the manner described in the document.

SUMMARY OF THE INVENTION

Consequently, the object of the invention is to provide a process for depositing, on the surface of glass filaments, minimal quantities of size solutions in the form of films of uniform thicknesses and capable of completely coating each filament, in such a way that these thicknesses can be precisely determined by choosing the operating conditions appropriately and can be reproduced with satisfactory reliability.

To this end, the main subject of the invention is a process for manufacturing a continuous yarn, which consists in forming a multiplicity of continuous filaments by the mechanical drawing of a multiplicity of streams of molten thermoplastics flowing out of the orifices of at least one device and which consists in depositing a mixture, in the liquid state, on the surface of at least some of the filaments before they are combined into at least one yarn. The invention lies more particularly in the successive steps consisting:

in continuously impregnating a mat of mechanically held-together fibres, such as a felt or a woven fabric, with the mixture in the liquid state;

in continuously taking up at least some of the said mixture by means of a rotating roller in contact with the said mat; and using the sizing roller, in depositing the said mixture on the filaments while they are being drawn.

This process opens the door to the uniform deposition, on the filaments, of quantities of size as low as 0.5 to 1% by weight with respect to the weight of the filaments— quantities which are sufficient in the case, especially, of currently known high-performance anhydrous sizes—with a deposition efficiency close to or equal to 100%.

This efficiency together with the homogeneity and reproducibility of the deposit formed on the filaments are achieved by virtue of the possibility, provided by the invention, of forming, on the surface of the sizing roller, a liquid film whose thickness is almost constant and less than 8 µm, preferably between 3 and 5 µm, with remarkable precision and reproducibility.

There is no loss of size to worry about; the gain in productivity is appreciable. For example, in the case of a spinneret producing 800 kg/day of filaments, a sizing rate as low as 160 to 350 g/h will be sufficient.

DETAILED DESCRIPTION OF THE PREFERRED EMBODIMENTS

According to the most common method of implementation, all the filaments constituting the yarn are made of glass. However, the invention does not exclude the variant in which the yarn consists of glass filaments and of organic filaments, only the glass filaments being provided with a coating of the said mixture in the liquid state or, on the contrary, the organic filaments also being provided with this coating, or with a coating of a different size, the various size compositions being especially capable of reacting with one another. Organic filaments should be understood to mean thermoplastic polymer filaments, such as polypropylene, polyamide or polyester filaments. These polymer filaments may be sprayed between the already-sized glass filaments, before all these filaments are converged into a yarn, as described in Patent EP 0,599,695.

Given the abovementioned properties of the anhydrous sizes, as well as their excellent capability of wetting the filaments, it is understandable that the liquid mixture to be deposited on the filaments preferably consists of such an anhydrous size, for the definition of which reference is made to the contents of the already-mentioned Patent EP 0,570, 283 and of the already-mentioned Applications FR 93/14792, 96/00067 and FR 97/05926.

Furthermore, a double or multiple application of the process of the invention to the filaments while they are being drawn, before they are converged into yarn(s), for the purpose of transferring thereto liquid compositions capable of reacting with one another especially at ambient temperature by the copolymerization of constituents belonging to such separate compositions, also forms part of the invention. In other words, the overall dimensions of the device necessary for implementing the process of the invention in no way prevents two or more of them being combined in order to deposit a double coating or a multiple coating on a single set of filaments, as described in Application FR 97/05926.

The yarns obtained by the process of the invention are generally collected in the form of packages on rotating supports. The yarns obtained according to the invention can be easily unwound from the packages and can be easily handled.

The yarns may also be collected on receiving supports undergoing translational motion. They may in fact be sprayed by a device, which also serves to draw them, onto the collecting surface which is moving transversely to the direction of the sprayed filaments, for the purpose of obtaining a web of intermingled continuous yarns, called a "mat". The yarns may also be chopped before collecting by a device serving also to draw them.

The yarns obtained according to the invention may thus be in various forms after collection, especially in the form of reels of continuous filaments (rovings, cakes, cops, etc.), or in the form of chopped yarns, and may be converged in the form of braids, tapes, mats or networks, these being in woven or non-woven form, etc. The glass filaments forming these yarns may have a diameter of between 5 and 30 microns and the glass used for producing these filaments may be any glass: E glass, AR (alkali-resistant) glass, etc.

The yarns obtained by a process according to the invention may be advantageously combined with various materials to be reinforced for the purpose of producing composite components which have good mechanical properties. The composites are advantageously obtained by combining at least one of the glass yarns according to the invention with at least one organic and/or inorganic material, the glass content of these composites generally being between 30 and 75% by weight.

Consequently, the subject of the invention is also a product consisting, at least in part, of a yarn obtained by a process as described above. This yarn may or may not have been subjected to a subsequent chopping or weaving treatment, to mechanical spraying or to any other shaping process; optionally, it is mixed with an organic or inorganic material in order to reinforce the latter.

This yarn has a low loss on ignition of at most 3% by weight and even, in many embodiments, at most equal to 1% by weight.

Figure 2:
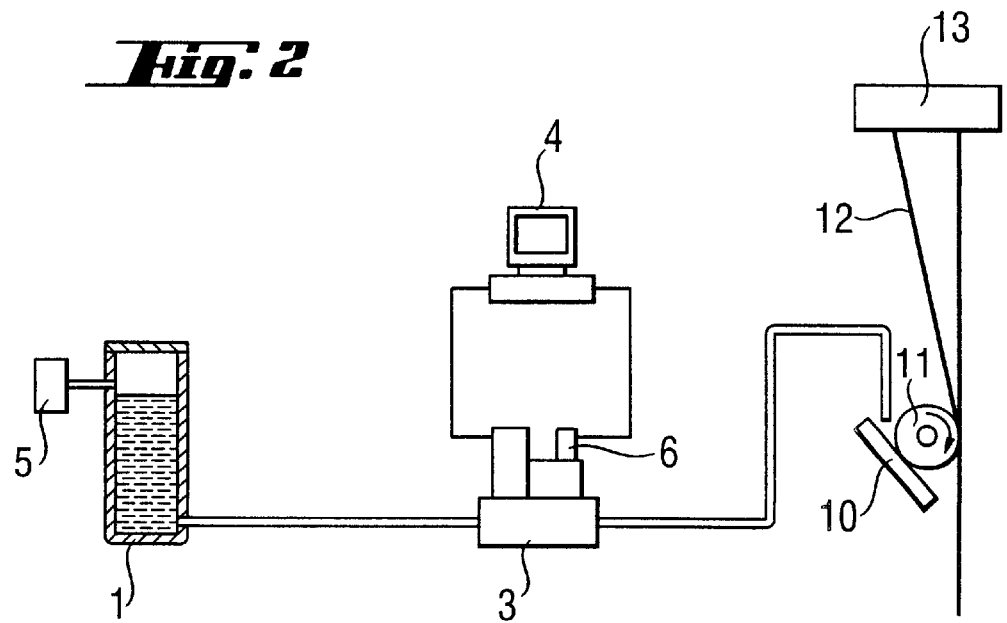
Figure 3:
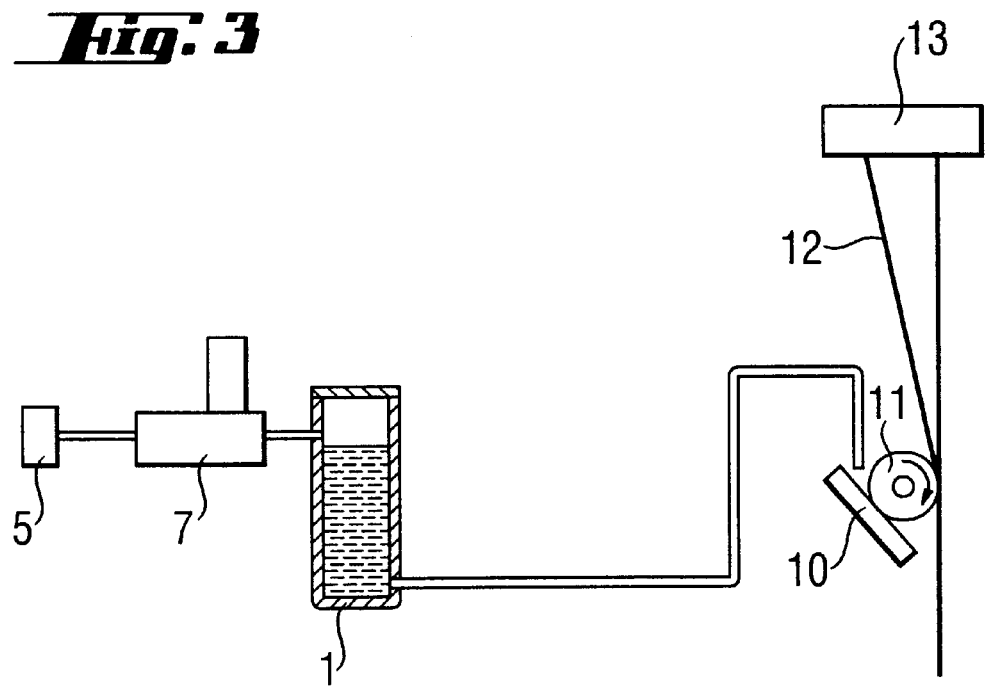

Other features and advantages of the invention will appear in light of the following description of the appended drawings in which:

FIGS. 1 to 3 are diagrammatic representations of three devices for implementing the process of the invention.

These devices comprise a tank 1 of size optionally maintained at a constant temperature, ensuring that the product is well preserved, so as to guarantee that the metering conditions remain stable.

According to FIG. 1, the size is drawn up by a pump 2 of the peristaltic or diaphragm type, which subjects the fluids to particularly low shear stresses.

The quantity drawn up is transferred onto the distributing felt 10 after having passed through a flow meter 3.

In addition, a microcomputer 4 is connected both to the flow meter 3 and to the pump 2 so as permanently to adapt the volume or the mass of size delivered by the pump 2 depending on the information supplied by the flow meter.

The devices shown in FIGS. 2 and 3 employ, for feeding the felt 10, a compressed-air supply 5 at the start of the fluid circuit upstream of the tank 1.

According to FIG. 2, the size coming from the tank 1 passes through a flow meter 3 and a regulating valve 6, both of these being connected to a microcomputer 4. This time, the microcomputer 4 uses the information delivered by the flow meter 3 to control, in real time, any correction to the flow rate by means of the regulating valve 6.

This regulating function is provided, in the simplified device shown in FIG. 3, by a temperature-compensating volumetric regulating valve 7 inserted in the fluid circuit between the pressurized-air supply 5 and the tank 1. The valve 7, having an integrated and autonomous regulating function, makes it unnecessary to use an auxiliary management and control device of the computer type.

The felt 10 is fixed to a rigid plate, the inclination of which plate may be modified and the pressure exerted on the roller by which plate may be controlled, for example, by means of a controlled-thrust pneumatic cylinder (not shown).

The felt 10 uniformly fed with size, has the function of distributing the latter over a portion of the surface of the sizing roller 11 which is slightly larger than that with which the web of filaments 12, delivered by the spinneret 13 and being drawn, comes into contact. The size flows into and is distributed in the inclined felt 10 by the action of gravity. The width of the impregnated area of the felt 10 (i.e. its transverse dimension with respect to a longitudinal direction defined by the flow over the inclined plane), the flow time and the distribution time depend on the viscosity of the size, on the characteristics of the felt (nature of the constituents, density, texture, dimensions) and on the positioning geometry (inclination).

The texture of the felt and the viscosity of the size are intimately connected. For example, a dense felt will be wetted on the surface by a viscous size whereas a liquid size will easily penetrate a not very dense felt and will flow out of it without being distributed over its entire width.

The inclination of the felt also plays an important role in distributing the size by allowing the gravitational forces to have a greater or lesser effect. This makes it possible to adjust the operation and to compensate for any shortcomings in the distribution which are due to a not entirely suitable felt.

The optimum correspondence between the viscosity of the size and the density of the felt is indicated in the table below in the case of a 30° inclination of the felt with respect to the horizontal, a flow length of 6 cm, a distribution width of 6 cm and a cylinder pressure on the coating device of 1 bar:

| Viscosity of the size at 20° C. (cP) | Density of the felt (g/dm$^3$) |
|---|---|
| <20 | 200–400 |
| 20–50 | 150–250 |
| 50–100 | 125–175 |
| 100–250 | 100–150 |
| 250–400 | <100 |

The nature of the felt has an effect on the quality with which the size is distributed in respect of three criteria associated with the type of fibre employed: the chemical nature of the fibres, their diameter and their homogeneity.

The great majority of the fibres making up the felts are composed of cellulose fibres or wool fibres. Synthetic fibres are also starting to be used, such as polypropylene fibres or polyester fibres.

In the case of size compositions whose constituents are not very polar, polypropylene-type synthetic felts are very suitable and the chemical compatibility is satisfactory. In the case of compositions having a marked polar character (which is the case with many constituent components in sizes), natural felts, of the wool type (which is more hydrophilic), are preferred.

The chemical compatibility of the various materials of the felts may be modified in one direction or another by a suitable chemical treatment of the fibres. However, the interactions with the components of the size (which, because of their monomeric character, are very good solvents) become difficult to control. In most cases, untreated fibres are preferred.

In general, the diameter of the fibres must be as homogeneous as possible in order to make it easier to transfer the size onto the roller. Any heterogeneity in the fibres, in particular the presence of coarse fibres, causes localized differences in thickness of the film of size on the surface of the sizing roller, but these are nevertheless liable to cause drying-induced breakages at the roller. Fibres of small diameter (generally 20 microns) are preferred. In addition, the fibres must be long enough, flexible enough and sufficiently entangled as to avoid any entrainment of entire fibres or breaks at the surface of the roller. The presence of foreign elements at the surface of the roller generally causes breakages whose origin is difficult to determine.

In normal operation, 100% of the size is transferred onto the sizing roller. To achieve such a performance, it is possible to vary different parameters.

In the first place, the pressure exerted by the felt on the roller leads to the formation of compressed area within the felt through which the flow is very greatly reduced. However, the pressure must not be too high so as not to damage the roller or the drive mechanisms.

The rotating roller takes up the size available, the latter being sufficiently compatible with the material of the roller not to cause the phenomenon of dewetting. In addition, the quantity of size is always much less than the roller is capable of taking up.

By way of example, in the case of a 40 mm diameter graphite roller having a felt/roller contact length of 80 mm, the pressure that needs to be exerted is, in most cases, between 0.5 and 3 bar.

Secondly, the speed of rotation of the roller has a certain effect on felt/roller transfer in a few special cases. Thus, when the size has a low viscosity and the surface of the roller is very effectively wetted thereby (generally, in the case of weakly polar sizes) and/or when the final product requires a high loss on ignition, i.e. a large quantity of size, it is useful to increase the speed of rotation of the sizing roller in order to increase the take-up area to be wetted and finally to increase the quantity of size transferred. When a 40 mm diameter graphite roller is used, the rate of rotation of the roller may be varied between 50 and 150 rpm in order to be satisfactory in most cases.

The third and final parameter to be taken into consideration in the quality of felt/roller transfer is that of the chemical nature and of the surface finish of the roller. Moreover, this parameter is incidentally even more significant in respect of the quality of roller/fibre transfer.

Given that the felt/roller and roller/glass-fibre transfer characteristics are intimately related, the best material is currently graphite.

In normal operation, the technique of depositing anhydrous sizes, as described above, allows a deposition efficiency of very close to or equal to 100% to be achieved. With aqueous sizes, this efficiency is generally about 40 to 75%. Given that the cost of the raw materials (in terms of dry matter) are substantially equivalent, the economic advantage of anhydrous sizes deposited using this method is readily apparent.

In addition, from the environmental standpoint, it is advantageous to eliminate one source of waste which is potentially polluting and gives rise to additional costs in order to destroy the effluents generated.

Should effluent be produced (generally in very small quantity) during cleaning, testing or operating under special conditions, and given that all of the waste is of an organic nature, this waste may easily destroyed by incineration in suitable plants.

What is claimed is:

1. A process for manufacturing a continuous yarn, which comprises the steps of:
   a) continuously impregnating a mat of mechanically held-together fibers with a mixture of anhydrous size in a liquid state;
   b) continuously taking up at least some of the mixture of the anhydrous size by a sizing roller in contact with the mat such that a liquid film having an almost constant thickness of less than 8 µm is formed thereon; and
   c) depositing said mixture of the anhydrous size, using the sizing roller, on a surface of at least some of a multiplicity of continuous filaments which are formed by mechanical drawing of a multiplicity of streams comprising molten glass flowing out of orifices of at least one device.

2. The process of claim 1, wherein the multiplicity of continuous filaments comprise polymer filaments and glass filaments.

3. The process of claim 1, wherein said mat of mechanically held-together fibers is a felt or woven fabric.

4. The process of claim 1, wherein the mixture in the liquid state is an anhydrous size.

5. The process of claim 1, wherein the mixture for impregnating the mat is fed by dispensing the mixture from a metering device.

6. The process of claim 5, wherein the metering device is a diaphragm or peristaltic pump.

7. The process of claim 1, wherein the metering device comprises a permanent control device comprising a flow meter inserted into a fluid circuit between the metering device and the mat, and a management and control device.

8. The process of claim 1, wherein the mixture for impregnating the mat is fed by delivering a pressurized gas upstream of a tank of the mixture in the liquid state.

9. The process of claim 8, wherein the device for feeding the mat comprises a regulating device comprising a flow meter and a regulating valve, which are inserted into the fluid circuit between the tank and the mat, and a management and control device.

10. The process of claim 9, wherein the device for feeding the mat comprises a regulating device comprising a temperature-compensating volumetric regulating valve inserted into the fluid circuit between the pressurized-air inlet and the tank.

11. The process of claim 1, wherein the surface of the mat defines an inclined plane and the flow and the distribution of the mixture in the liquid state within the mat occurs by gravity.

12. The process of claim 1, wherein the mat comprises synthetic felts, synthetic fabrics, natural felts or natural fabrics.

13. The process of claim 12, wherein said synthetic felts or synthetic woven fabrics are made of polypropylene or polyester.

14. The process of claim 12, wherein said natural felts or natural woven fabrics are made of wool or cellulose.

15. The process of claim 1, wherein the mat comprises fibers having diameters of less than 20 µm.

16. The process of claim 1, wherein the sizing roller has surface micropores with dimensions of less than 10 µm.

17. The process of claim 1, wherein the sizing roller has a surface made of graphite.

18. The process of claim 1, wherein the mixture of anhydrous size in the liquid state is deposited onto the filaments in an amount of at most 3% by weight with respect to the weight of the filaments.

19. The process of claim 1, which is effected several times in succession in order to transfer, separately, onto the filaments, multiple applications of the mixture of anhydrous size in the liquid state which react with one another.

20. The process of claim 19, wherein the mixture of anhydrous size in the liquid state is deposited on the filaments in an amount of at most 1% by weight with respect to the weight of the filaments.

21. The process of claim 1, wherein the mat of mechanically held-together fibers comprises a web of intermingled continuous yarns formed from said filaments.

22. The process of claim 1, wherein said anhydrous size is selected from the group consisting of UV-curable sizes, thermally-curable sizes, and room temperature-curable sizes.

23. The process of claim 2, wherein the thickness of the film of the mixture of anhydrous size in the liquid state formed on the surface of the sizing roller is between 3 and 5 µm.

24. The process of claim 1, wherein a deposition efficiency of about 100% is obtained.

* * * * *